US007383906B2

(12) United States Patent
Sewell

(10) Patent No.: US 7,383,906 B2
(45) Date of Patent: Jun. 10, 2008

(54) ROTATABLE AND TELESCOPIC WORK MACHINE

(75) Inventor: Andrew J. Sewell, Bardon Mill (GB)

(73) Assignee: JLG Industries, Inc., McConnellsburg, PA (US)

( * ) Notice: Subject to any disclaimer, the term of this patent is extended or adjusted under 35 U.S.C. 154(b) by 296 days.

(21) Appl. No.: 10/230,811

(22) Filed: Aug. 29, 2002

(65) Prior Publication Data

US 2004/0040137 A1 Mar. 4, 2004

(51) Int. Cl.
*B62D 33/00* (2006.01)

(52) U.S. Cl. .............................. 180/89.13; 180/89.12; 212/253; 414/685

(58) Field of Classification Search ................ 414/718, 414/685, 680, 728; 212/290, 238, 353; 180/89.12, 89.13; 280/763.1
See application file for complete search history.

(56) References Cited

U.S. PATENT DOCUMENTS

| | | | |
|---|---|---|---|
| 1,650,255 A | 11/1927 | Bannister | |
| 1,845,161 A | 2/1932 | Lewis | |
| 2,606,417 A | 8/1952 | Richey | |
| 2,675,927 A * | 4/1954 | Le Torneau | 212/253 |
| 2,809,756 A * | 10/1957 | Bannister | 212/298 |
| 2,911,111 A * | 11/1959 | Grove | 212/349 |
| 2,917,189 A * | 12/1959 | Isaacs | 212/238 |
| 3,285,432 A | 11/1966 | Stauffer | |
| 3,288,316 A | 11/1966 | West | |
| 3,543,956 A | 12/1970 | Furono et al. | |
| 3,601,169 A * | 8/1971 | Hamilton et al. | 144/34.1 |
| 3,721,350 A * | 3/1973 | Nephew | 212/288 |
| 3,738,442 A | 6/1973 | Eiler | |
| 3,807,586 A | 4/1974 | Holopainen | |
| 3,858,675 A | 1/1975 | Geis | |
| 3,937,339 A | 2/1976 | Geiss et al. | |
| 3,967,744 A | 7/1976 | Goyarts | |
| 3,985,248 A | 10/1976 | Liegel et al. | |
| 4,031,976 A * | 6/1977 | Lambert | 180/14.1 |
| 4,034,875 A | 7/1977 | Pugh et al. | |
| 4,042,135 A | 8/1977 | Pugh et al. | |
| 4,066,143 A | 1/1978 | Umeda et al. | |
| 4,082,197 A | 4/1978 | Stedman | |
| 4,102,461 A | 7/1978 | Soyland | |
| RE30,021 E | 6/1979 | Olson et al. | |
| 4,194,639 A * | 3/1980 | Grove | 212/290 |
| 4,216,869 A * | 8/1980 | Grove | 212/290 |
| 4,382,743 A | 5/1983 | Newell | |

(Continued)

FOREIGN PATENT DOCUMENTS

| | | |
|---|---|---|
| DE | 1281652 | 10/1968 |

(Continued)

*Primary Examiner*—David P. Bryant
*Assistant Examiner*—Sarang Afzali
(74) *Attorney, Agent, or Firm*—Nixon & Vanderhye P.C.

(57) ABSTRACT

The present invention is a rotatable work machine that includes a lower frame assembly having a recessed area in which the operator portion of an upper frame assembly and power source are at least partially positioned. Further, a method of manufacturing and assembling the lower frame assembly enables various size configurations for the work machine. The method of manufacturing and assembling the work machine, along with the specific design and positioning of the various components therein, enhances stability, clearance, and operator visibility with reduced costs and complexity.

40 Claims, 11 Drawing Sheets

U.S. PATENT DOCUMENTS

| | | | | |
|---|---|---|---|---|
| 4,405,280 | A | | 9/1983 | Cochran et al. |
| 4,553,899 | A | | 11/1985 | Magni |
| 4,632,630 | A | | 12/1986 | Maki et al. |
| 4,674,944 | A | | 6/1987 | Addleman |
| 4,744,718 | A | | 5/1988 | Logan et al. |
| 4,755,102 | A | | 7/1988 | Merlo |
| 4,775,288 | A | | 10/1988 | Dimitriu |
| 4,797,060 | A | | 1/1989 | Kishi et al. |
| 4,806,067 | A | | 2/1989 | Odlund |
| 4,860,539 | A | | 8/1989 | Parrett et al. |
| 4,964,778 | A | | 10/1990 | Muto et al. |
| 4,964,780 | A | | 10/1990 | Karvonen |
| 4,984,695 | A | * | 1/1991 | Goto .......................... 212/231 |
| 4,986,721 | A | | 1/1991 | Lowder et al. |
| 4,997,333 | A | | 3/1991 | Ball et al. |
| 5,061,149 | A | | 10/1991 | Lowder et al. |
| 5,064,242 | A | | 11/1991 | Fujan et al. |
| 5,085,520 | A | | 2/1992 | Fujan |
| 5,088,570 | A | | 2/1992 | Loeber |
| 5,106,257 | A | | 4/1992 | Braud et al. |
| 5,163,700 | A | | 11/1992 | Loeber |
| 5,199,861 | A | | 4/1993 | Merlo et al. |
| 5,265,995 | A | | 11/1993 | Beck |
| 5,478,192 | A | | 12/1995 | Bentivoglio |
| D384,477 | S | | 9/1997 | Braud |
| 5,687,809 | A | | 11/1997 | Braud |
| 5,711,095 | A | | 1/1998 | Oda et al. |
| 5,964,567 | A | | 10/1999 | Bamford |
| 6,024,232 | A | | 2/2000 | Helgesson |
| 6,048,161 | A | | 4/2000 | Merlo et al. |
| 6,071,066 | A | | 6/2000 | Braud |
| D432,753 | S | | 10/2000 | Braud |
| 6,129,169 | A | | 10/2000 | Skirde |
| 6,132,164 | A | | 10/2000 | Way et al. |
| 6,138,844 | A | | 10/2000 | Helgesson |
| 6,217,128 | B1 | | 4/2001 | Tillman, Jr. |
| 6,290,009 | B1 | | 9/2001 | Kondo et al. |
| 6,336,784 | B1 | | 1/2002 | Monaghan |
| 2001/0043855 | A1 | | 11/2001 | Granroth et al. |
| 2002/0001516 | A1 | | 1/2002 | Cook et al. |
| 2002/0006325 | A1 | | 1/2002 | Granroth et al. |
| 2002/0006326 | A1 | | 1/2002 | Trinler et al. |

FOREIGN PATENT DOCUMENTS

| | | | | |
|---|---|---|---|---|
| EP | 0156546 | | | 10/1985 |
| EP | 0504527 | A1 | | 9/1992 |
| EP | 0568758 | B1 | | 11/1993 |
| EP | 0670391 | B1 | | 9/1995 |
| EP | 0 764 743 | A1 | | 3/1997 |
| EP | 0870727 | A2 | | 10/1998 |
| EP | 0953540 | A1 | | 11/1999 |
| EP | 0978472 | A2 | | 2/2000 |
| EP | 1061187 | A1 | | 12/2000 |
| FR | 2 175 660 | | | 10/1973 |
| FR | 2 211 568 | | | 7/1974 |
| GB | 1 358 458 | | | 7/1974 |
| GB | 2004524 | | | 4/1979 |
| GB | 2086347 | | | 5/1982 |
| GB | 2142312 | A | * | 1/1985 |
| GB | 2344809 | | | 6/2000 |
| WO | WO 97/46478 | | | 12/1997 |

* cited by examiner

ROTATABLE AND TELESCOPIC WORK MACHINE

TECHNICAL FIELD

This invention relates generally to a rotatable and telescopic work machine and, more particularly, to a rotatable and telescopic work machine having a low clearance height, a low center of gravity, and unobstructed operator visibility.

BACKGROUND

In current rotatable and telescopic work machines, such as material handling machines, the overall height of the work machine is generally increased due to the "stacking" of various components, such as, the rotation means, cab, engine and telescopic boom. The significant height of the work machine limits its ability to enter certain work areas or buildings that have space constraints at access doors, service entries, and the like. Further, the positioning of the various components on some of these work machines causes weight distribution problems as the center of gravity is elevated and focused. Weight distribution problems can reduce efficiency or performance of the work machine. Additionally, an elevated center of gravity reduces stability of the work machine and reduces operator visibility as the various components are placed at higher levels. Visibility may be further impaired on some of these work machines when the telescopic boom is mounted on one side of the cab and blocks the operator's view of a work implement, attached to the telescopic boom, or the surrounding terrain.

One known rotatable and telescopic work machine, U.S. Pat. No. 4,216,869 issued to John J. Grove on Aug. 12, 1980, discloses an industrial crane that has a chassis mounting a housing. The chassis has a horizontal deck with a central well that provides access to a bearing for a rotatable upper works. The upper works has a portion that extends into the well and to the bearing. The upper works also includes a cab directly over the bearing, a boom support rearward of the cab, an engine rearward of the boom support and above the chassis, and a lifting boom journalled to the boom support rearward of and extending forwardly over the cab. The boom, cab, and engine have their lateral centers in line along the median plane of the upper works. The median plane of the upper works coincides with the median plane of the chassis when the upper works is in the forward or reverse position. Although the positioning of a portion of the upper works within the well assists in lowering the center of gravity of the crane, the positioning of the engine above the chassis distributes weight at an elevated level that nullifies the low center of gravity benefits. Additionally, the positioning of the engine rearward of the boom support may create an unfavorable distribution of weight at the rear of the crane, lowering its efficiency and stability. Further, the positioning of the engine in such a manner results in a low clearance height for the swing radius of the boom and effectively blocks all rear visibility for the operator during operation of the crane.

Other rotatable work machines that do not have telescopic booms, such as excavators, may also have similar deficiencies as those work machines with telescopic booms. For example, U.S. Pat. No. 4,102,461 issued to Ingebret Soyland on Jul. 25, 1978, discloses a rotatable excavator with a low center of gravity. The excavator includes a vessel-like lower frame with a vertical side wall and a bottom wall that forms a support plate. An upper frame is mounted on the lower frame for rotation about a vertical axis. The upper frame carries a cabin, a boom, and a bucket assembly. The engine and other heavy equipment components for operating the excavator along with the rotation means are secured to the underside of the upper frame in a suspended manner. In order to rotate the upper frame, along with the boom, bucket assembly, and engine, the rotating means engages with a gear in the lower frame. Although the center of gravity is lowered and visibility is improved in this excavator design, the height of the excavator is still defined by the full height of the lower and upper frames due to the upper frame being "stacked" on the lower frame. While this may not be as great an issue in a rotatable excavator that typically works in an external environment, any increase of height in a rotatable and telescopic work machine lowers its accessibility to enclosed work areas or buildings that have space constrained entryways.

The present invention is directed to overcoming one or more of the problems as set forth above.

SUMMARY OF THE INVENTION

In one aspect of the present invention, a work machine is disclosed that has vertical axis. The work machine has a lower frame assembly with a recessed area therein. An upper frame assembly is connected with the lower frame assembly to allow independent rotation about the vertical axis. An operator portion of the upper frame assembly is at least partially positioned within the recessed area of the lower frame assembly. A power source is connected with the upper frame assembly and is at least partially positioned within the recessed area of the lower frame assembly.

In another aspect of the present invention, a work machine with a vertical axis is disclosed. The work machine has a lower frame assembly with top and bottom surfaces and a predetermined height. An upper frame assembly is connected with the lower frame in a manner that allows independent rotation about the vertical axis and has a predetermined height. A portion of the height of the upper frame assembly defines a portion of the height of the lower frame assembly. Driving means is included that has top and bottom surfaces as well as a midpoint substantially therebetween. The driving means supports the lower and upper frame assemblies with the top surface of the lower frame assembly being equal with or below the top surface of the driving means and the bottom surface of the lower frame assembly being equal with or below the midpoint of the driving means.

In yet another aspect of the present invention, a work machine is disclosed that has a vertical axis. The work machine comprises a lower frame assembly that defines a recessed area therein. Rotation means has a defined opening therethrough and is at least partially disposed within the recessed area of the lower frame assembly and connected therewith. An upper frame assembly is connected with the rotation means for independent rotation about the vertical axis and includes an operator portion. The operator portion is at least partially disposed within the opening of the rotation means.

In yet another aspect of the present invention, a method is disclosed for an operator to access a work machine. The work machine has a lower frame assembly, an upper frame assembly connected with the lower frame assembly and a vertical axis. The upper frame assembly is rotatable about the vertical axis relative to the lower frame assembly. The method includes positioning a lower portion of the upper frame assembly in the lower frame assembly. The method further includes connecting the upper frame assembly with the lower frame assembly to define a step area. The method further includes stepping up from the ground to the step area and stepping down from the step area to the lower portion of the upper frame assembly.

In yet another aspect of the present invention, a method of manufacturing and assembling a work machine is disclosed to achieve various size configurations for the work machine. The method includes the steps of manufacturing a plurality of various sized lower frame assemblies, manufacturing a common and predetermined sized open area within each of the plurality of lower frame assemblies, manufacturing a plurality of upper frame assemblies, manufacturing a plurality of various sized boom assemblies, identifying a first select boom assembly from the plurality of boom assemblies, connecting the first select boom assembly with a first one of the plurality of upper frame assemblies, positioning the first one of the plurality of upper frame assemblies through the open area in a first one of the plurality of lower frame assemblies, and connecting the first one of the plurality of upper frame assemblies with the first one of the plurality of lower frame assemblies.

The present invention is a rotatable work machine that includes a lower frame assembly having an open area in which the operator portion of an upper frame assembly and power source are at least partially positioned. This serves to reduce the overall height of the work machine to the point where it can easily access enclosed work areas or buildings having space constrained entryways. Additionally, specific positioning of the various components at a lower level on the work machine provides a low center of gravity with improved operator visibility. Further, the manufacturing and assembly of the work machine is such that costs and complexity are reduced.

DETAILED DESCRIPTION

Figure 1:
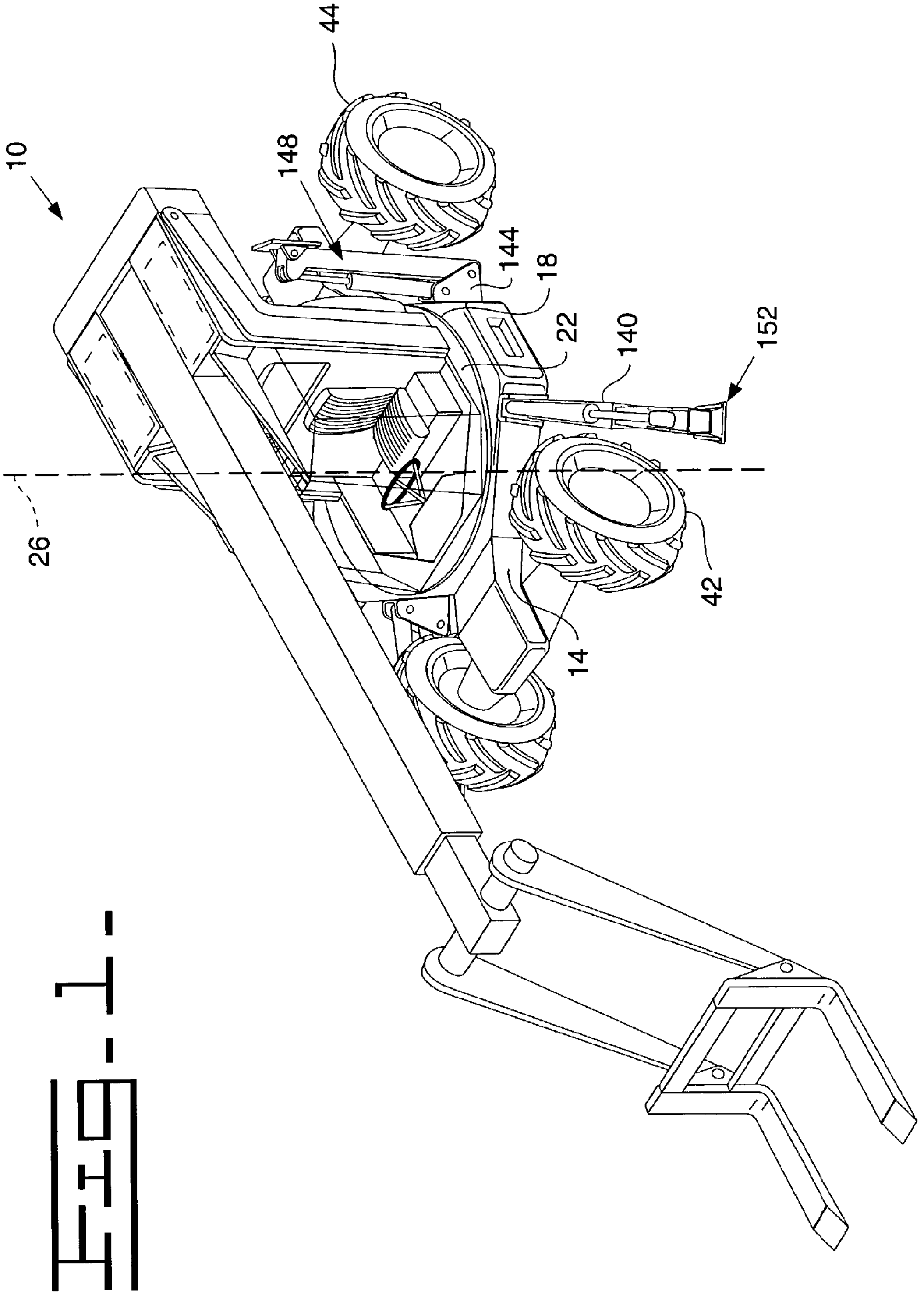
FIG. 1 is a diagrammatic, perspective representation of the present invention featuring an improved rotatable and telescopic work machine.

While the invention is open to various modifications and alternative forms, a specific embodiment thereof has been shown by way of example in the drawings and will herein be described in detail. However, there is no intent to limit the invention to the particular form disclosed.

Referring to the drawings, a rotatable and telescopic work machine 10 is shown. It should be understood that although the work machine shown includes telescopic capabilities, any work machine having an upper rotatable portion is conceivably within the scope of the invention. The work machine 10 has a front end portion 14, a rear end portion 18 and a central portion 22 through which a vertical axis 26 extends.

Figure 3:
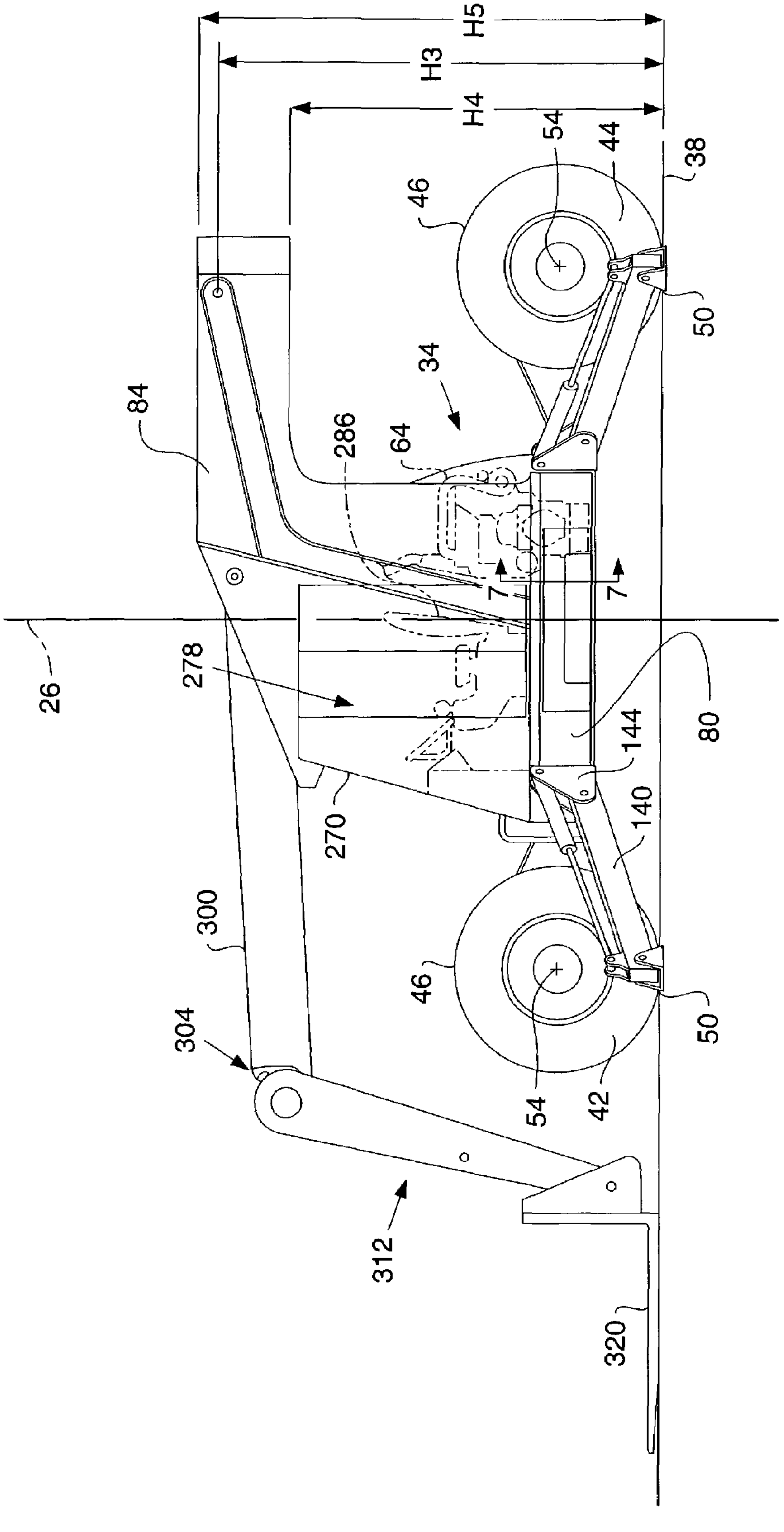
FIG. 3 is a side view of the work machine showing the location and positioning of a cab assembly and various components in relation to the upper and lower frame assemblies.
Figure 4:
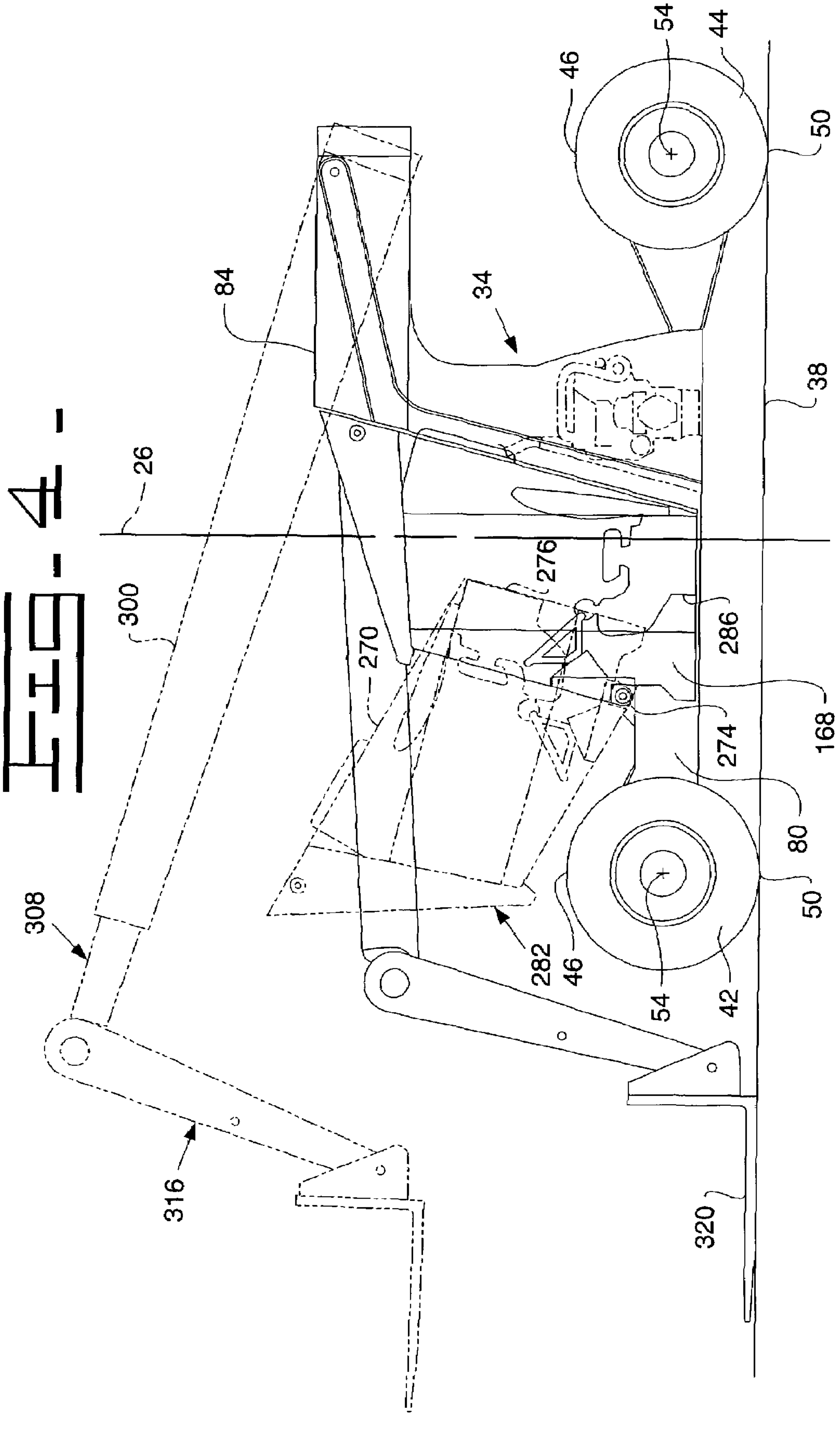
FIG. 4 is a side view of the work machine with some components removed to show the cab assembly pivoted forward to a maintenance position.
Figure 8:
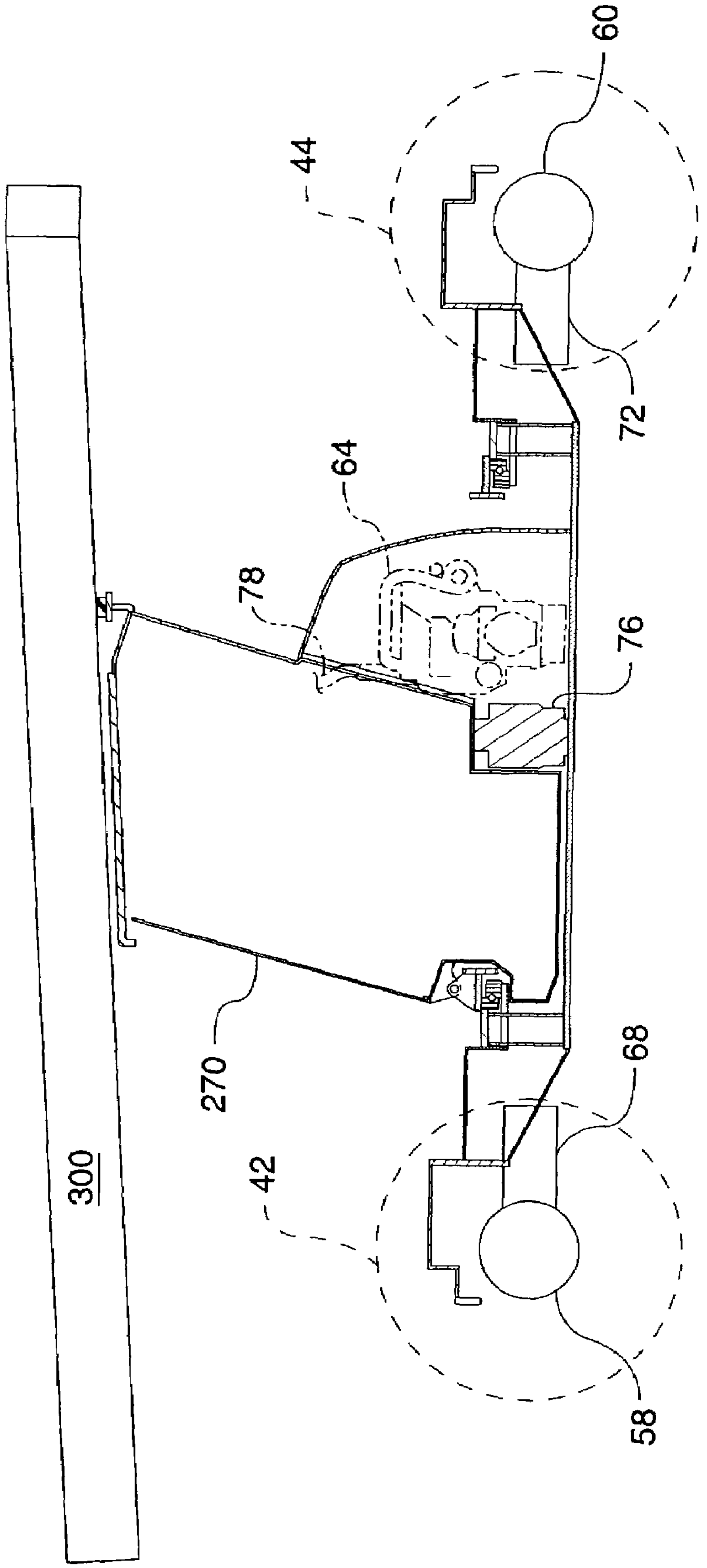
FIG. 8 is a diagrammatic side view of the work machine with various components removed to outline the cab assembly and surrounding components in relation to a pair of axle assemblies.

The work machine 10 includes a mainframe assembly 34, seen best in FIGS. 3-4, that is supported against the ground 38 by driving means, such as a pair of front and rear wheels 42,44. It should be understood that any suitable driving means, such as a metallic or rubber track, might be utilized in place of the wheels 42,44 and still be within the scope of the invention. The wheels 42,44 each have top and bottom surfaces 46,50, respectively, and a midpoint 54 located substantially at the mid-portion of the wheels 42,44. Referring more specifically to FIG. 8, the wheels 42,44 are connected with the work machine 10 through a pair of axle assemblies 58,60. A power source 64, such an internal combustion engine, is hydraulically connected with a pair of motors 68,72 through a swivel coupling 76. It should be understood that any other suitable device or means, such as mechanical, electrical or electronic, may be used to transmit power to the axle assemblies 58,60 for driving the work machine 10 over a variety of terrains (not shown). A cooling system 78 is connected with the power source 64 and is used for cooling various fluids used within the work machine 10.

Figure 7:
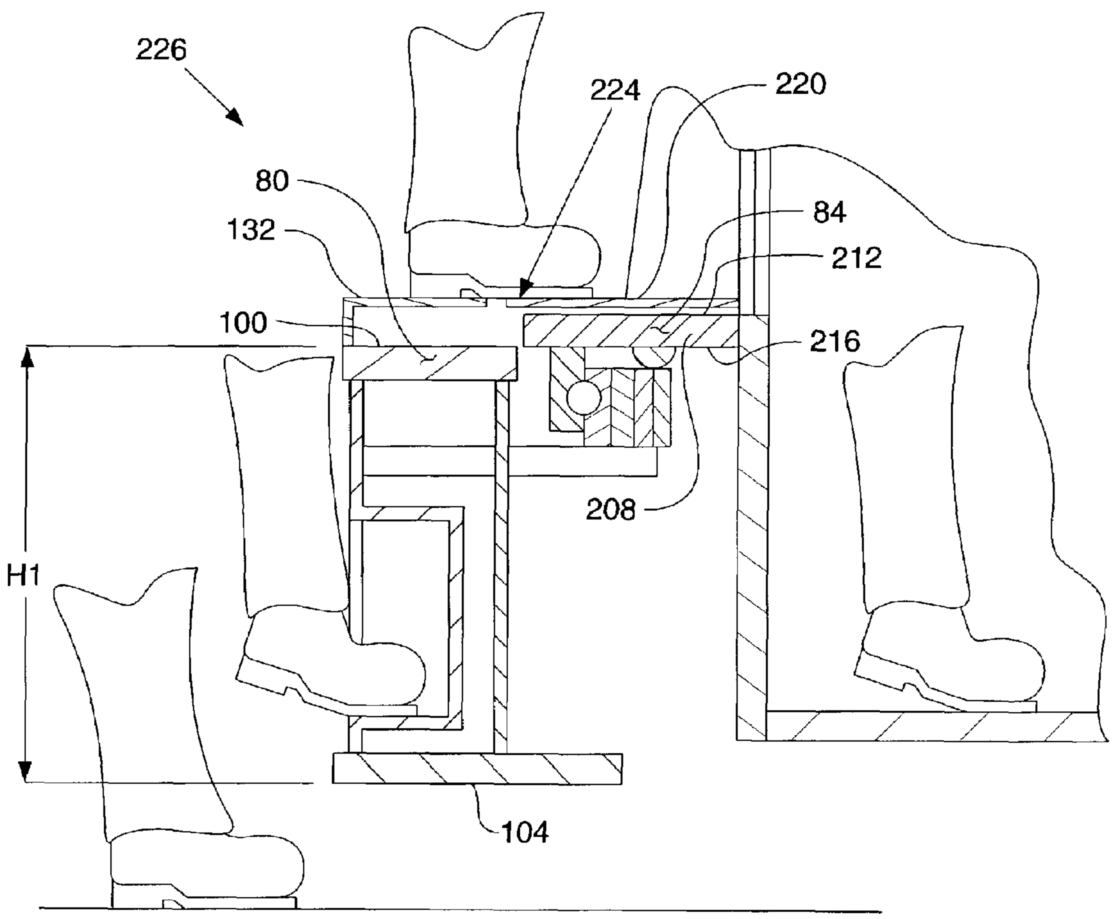
FIG. 7 is a diagrammatic, section view, taken along line 7-7 in FIG. 3, showing a step area for accessing the cab assembly of the work machine.

As seen best in FIGS. 5*a*-5*e* and 7-8, the mainframe assembly 34 includes a lower frame assembly 80 and an upper frame assembly 84. As will be described in more detail below, the lower and upper frame assemblies 80,84 are manufactured and assembled with a predetermined method 86 to achieve various size configurations for the work machine 10. The lower frame assembly 80 has a body portion 88 that includes a front end 92, a rear end 96, a substantially planar top surface 100, a substantially planar bottom surface 104 and a predetermined vertical height H1 measured between the bottom and top surfaces 104,100, as seen in FIG. 7. The body portion 88 further includes an inner, open area 108 that is recessed therein to define a floor 112 adjacent the bottom surface 104 and accessible with the ground 38. A ledge 116 extends from the body portion 88 between the top and bottom surfaces 100,104 and into the recessed area 108. A pair of arms 120,124 extend substantially upwardly and outwardly from the body portion 88 at the respective front and rear ends 92,96 for mounting the axle assemblies 58,60 in a spaced relationship with the body portion 88. Although the body portion 88 and arms 120,124 are shown constructed with a plurality of interconnected and welded metallic plates, as seen in FIGS. 7-8, it should be understood that the body portion 88 may be constructed in any suitable manner, such as by any suitable molding process, as long as a strong and reliable support platform is created. A foot holding area 128 is defined within the body portion 88 between the bottom and top surfaces 104,100. A tread plate 132, shown in FIG. 7, is connected on the top surface 100 of the body portion 88 and is operative with the foot holding area 128 to assist an operator (not shown) during ingress to or egress from the work machine 10.

Figure 2:
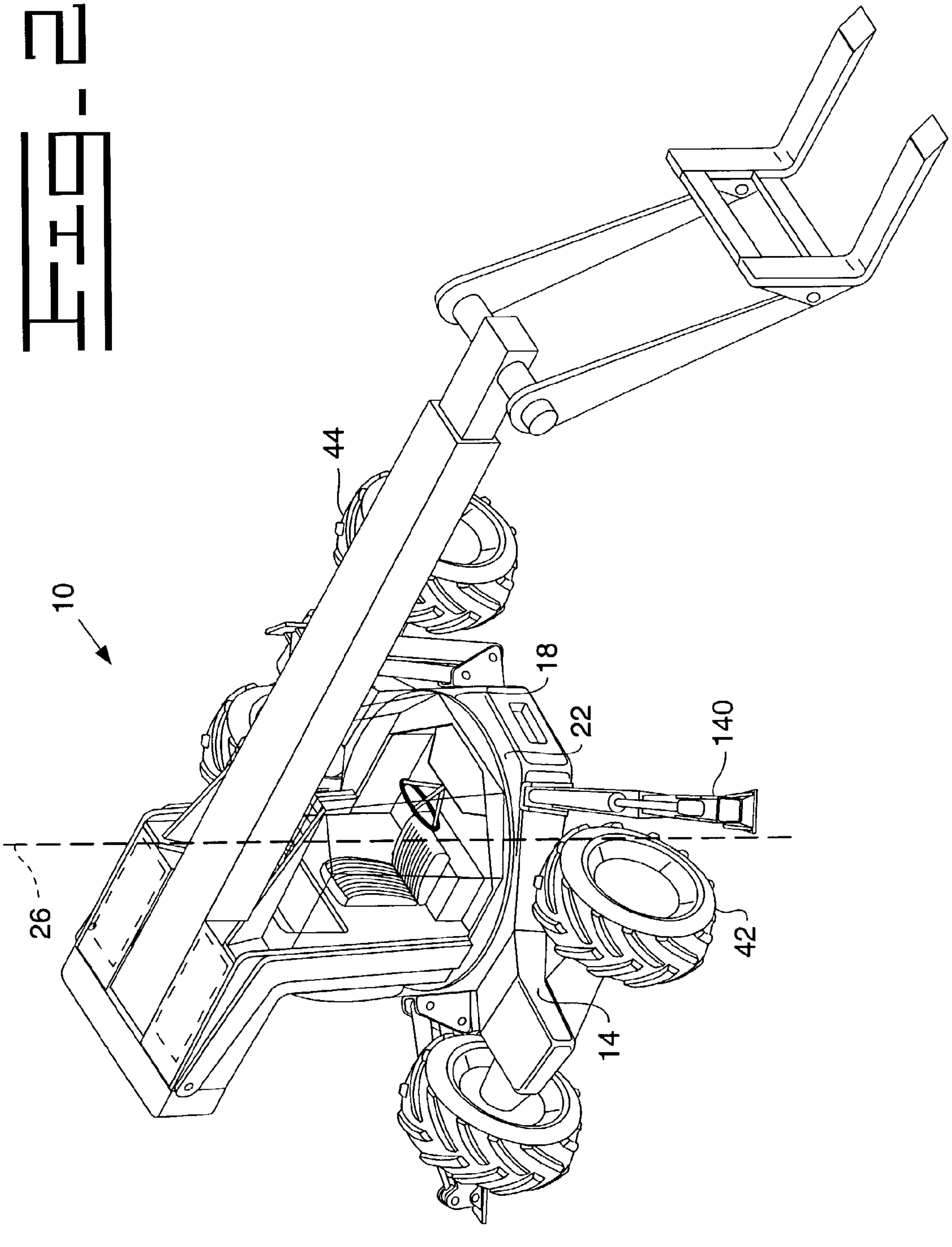
FIG. 2 is the diagrammatic, perspective representation of the work machine of FIG. 1 with an upper frame assembly rotated in relation to a lower frame assembly.

As seen best in FIGS. 1-2 and 5*a*-5*e*, pairs of spaced front and rear stabilizer leg assemblies, one of which is shown at 140, are pivotally connected via a mounting bracket 144 at each of the front and rear ends 92,96 of the lower frame assembly 80. The stabilizer leg assemblies 140 are movable diagonally outward from a fully retracted position 148 to a fully extended position 152. As shown in FIGS. 1-2, the rear stabilizer leg assemblies 140 are positioned between the rear wheels 44 when in the fully retracted position 148 and positioned outside the rear wheels 44 when in the fully extended position 152. Similarly, the front stabilizer leg assemblies 140 are positioned between the front wheels 42 when in the fully retracted position 148 and positioned outside the front wheels 42 when in the fully extended position 152. The stabilizer leg assemblies 140 define an outline or footprint 156 having a substantially square configuration when in the extended position 152 and in contact with the ground 38.

Referring now more specifically to FIGS. 5*a*-5*e*, the upper frame assembly 84 has a lower portion 160 positioned within the recessed area 108 of the lower frame assembly 80 and an upper or support portion 164 extending from the lower portion 160. The upper frame assembly 84 has a predetermined height H2 that is measured between the lower and upper portions 160,164 and defines a portion of the height H1 of the lower frame assembly 80. The lower portion 160 includes an operator portion 168 with front and rear ends 172,176, respectively, and an enclosure portion 180 adjacent the operator portion 168. The upper portion 164 includes a pair of spaced tower assemblies 184,188 positioned at the rear end 172 of the operator portion 168 that define a substantially non-obstructed viewing area 196 from the rear end 172 of the operator portion 168 to the surrounding terrain (not shown). The tower assemblies 184, 188 are connected via a reinforcing wall 200 extending therebetween that substantially separates the operator portion 168 from the enclosure portion 180. The reinforcing wall 200 defines a rear window 204 therethrough that is operative with the substantially non-obstructed viewing area 196. The power source 64 is connected at the lower portion 160 of the upper frame assembly 84 and positioned within the enclosure portion 180 and substantially between the tower assemblies 184,188. A counterweight 206 is positioned at the upper portion 164 and spaced from the power source 64. A portion of the cooling system 78, such as a heat exchanger 207, may be positioned within the upper portion 164 adjacent the tower assemblies 184,188 and counterweight 206. It should be understood that one or more heat exchangers 207 may be positioned within the upper portion 164.

As seen best in FIG. 7, a laterally extending shelf 208 is connected between the upper and lower portions 164,160 of the upper frame assembly 84. The shelf 208 has upper and lower surfaces 212,216 and an overlapping relationship with the top surface 100 of the lower frame assembly 80. A tread ring 220 is connected at the upper surface 212 of the upper shelf 208 in mating relationship with the tread plate 132 to define a substantially planar step area 224 therebetween that provides a method 226 for the operator (not shown) to access the work machine 10. Although the tread plate 132 and tread ring 220 are shown as separate components connected with the respective lower and upper frame assemblies 80,84, it should be understood that the top surface 100 of the lower frame assembly 80 and the upper surface 212 of the upper frame assembly 84 may be textured to provide an equivalent step area 224 without the use of the separate tread plate and ring 132,220.

Figure 9:
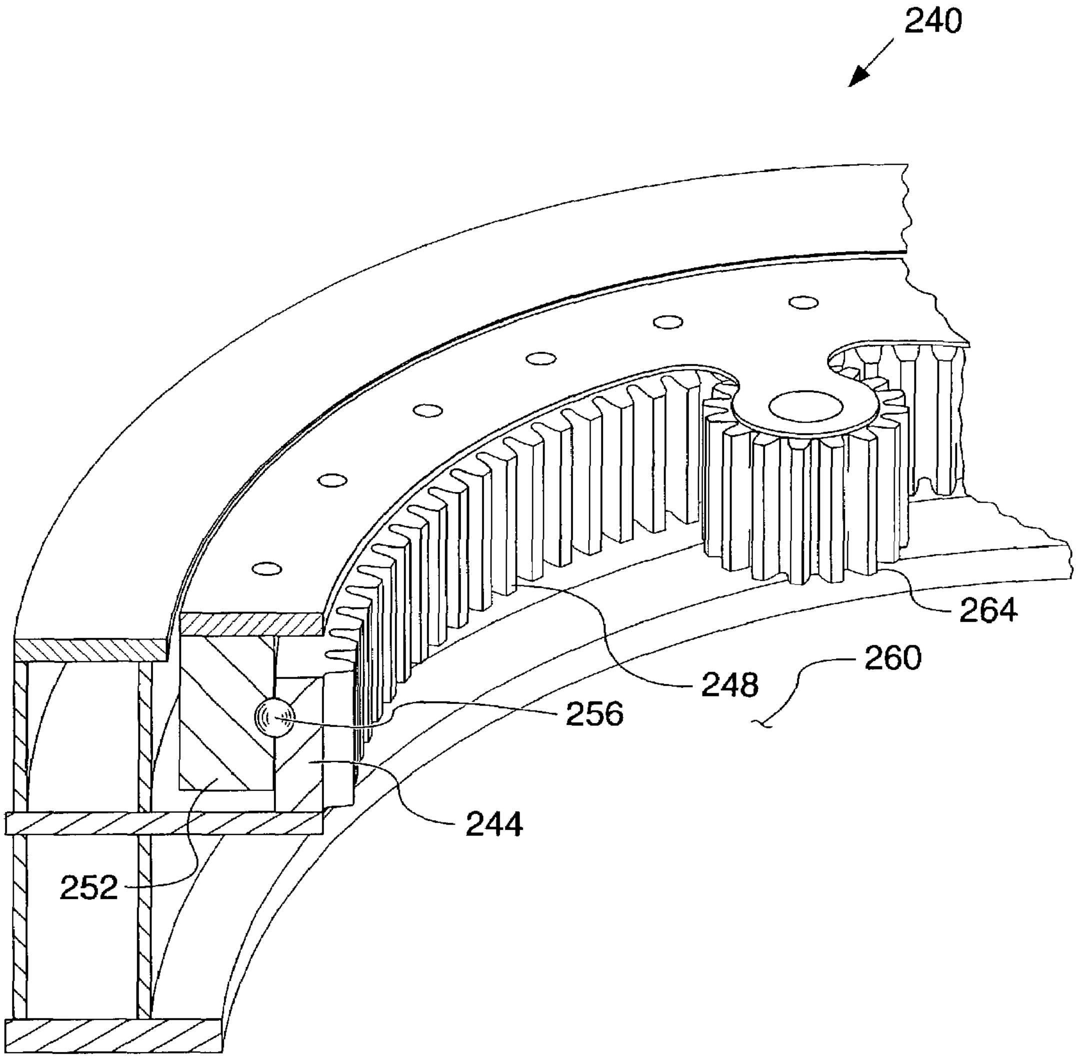
FIG. 9 is a partial, perspective view of a slew ring assembly used on the work machine to achieve rotational movement of the upper frame assembly.

As seen most clearly in FIG. 9, rotation means 240, such as a slew ring assembly, is connected between the upper and lower frame assemblies 84,80, respectively, to allow independent rotation of the upper frame assembly 84 around the lower frame assembly 80. It should be understood that other rotation means, such as any suitable gearing or bearing system, may be used in place of the slew ring assembly and still be within the scope of the invention. The slew ring assembly 240 is substantially positioned within the recessed area 108. The slew ring assembly 240 has a first, inner ring portion 244 with an inner surface having a plurality of teeth 248, a second, outer ring portion 252 and a bearing assembly 256 positioned between the inner and outer ring portions 244,252. The inner and outer ring portions 244,252 define an opening 260 therethrough through which the lower portion 160 of the upper frame assembly 84 is positioned. The positioning of the upper frame assembly 84 in such a manner correspondingly positions the operator portion 168 and enclosure portion 180 at least partially within the recessed area 108. The inner ring portion 244 is connected with an upper surface on the ledge 116 of the lower frame assembly 80. The outer ring portion 252 is connected with the lower surface 216 on the shelf 208 of the upper frame assembly 84. A drive gear 264 is connected with the upper shelf 208 and extends inwardly for positioning within the recessed area 108. The outer ring portion 252 and the drive gear 228 are positioned in a spaced relationship on opposite sides of the inner ring portion 244. The drive gear 228 is powered in any suitable manner, such as through a drive motor (not shown), and engages with the plurality of teeth 248 to facilitate the rotation of the upper frame assembly 84 about the vertical axis 26 via the propulsion of the outer ring portion 252 around the inner ring portion 244 as allowed by the bearing assembly 256. Although the slew ring assembly 240 is shown having separate inner and outer ring portions 244, 252, it should be obvious that the ring portions may be integrally formed with the respective upper and lower frame assemblies 84,80. Further, it should be understood that any suitable rotation means, other than the slew ring assembly 240, may be utilized between the upper and lower frame assemblies 84,80 and is within the scope of the invention.

As seen best in FIGS. 3-6 and 8, an operator station or cab assembly 270 is connected with the upper frame assembly 84 at pivot joint 274 for rotation therewith about the vertical axis 274. The cab assembly 270 has a lower portion 276 positioned within the operator portion 168 for partial seating within the recessed area 108. The cab assembly 270 is moveable at the pivot joint 274 between an operating position 278, shown in FIG. 3, that substantially encloses the operator portion 168 and a maintenance position 282, shown in FIG. 4, that allows access to the power source 64, swivel coupling 76, and various other surrounding components. The cab assembly 270 includes a seat 286 therein for seating a portion of an operator's body (not shown) within the recessed area 108. Steering means 290 adjacent the seat 286 is connected with the power source 64 for driving the wheels 42,44. Electrical means 294, such as a switch, is positioned within the cab assembly 270 to prevent the rotation of the upper frame assembly 84 if desired by the operator (not shown). It should be understood that any other suitable means, such as mechanical or electronic, may be used to prevent the rotation of the upper frame assembly 84.

A boom assembly 300 is pivotally mounted at the upper portion 164 of the upper frame assembly 84 for rotation therewith about the vertical axis 26. The boom assembly 300 is positioned above the operator portion 168 opposite the lower frame assembly 80. The boom assembly 300 is moveable between a lowered position 304, shown in FIG. 3, that defines a spaced and parallel relationship with the lower frame assembly 80 and a plurality of angled positions, one of which is shown in FIG. 4 at 308. It should be understood that an angled position, such as that shown at 308, is necessary in order for the cab assembly 270 to pivot to the maintenance position 282. The boom assembly 300 is also moveable telescopically between a retracted position 312, shown in FIG. 3, and a plurality of extended positions, one of which is shown in FIG. 4 at 316. An implement 320, such as forks, is positioned at the front end of the boom assembly 300 in a well-known manner. It should be understood that any implement may be utilized with the boom assembly 300 other than that shown. The boom assembly 300 traverses the vertical axis 26, as seen best in FIG. 6, and is positioned in the manner described so that a substantially non-obstructed viewing area 324 is established from the front end 172 of the operator portion 168, where an operator (not shown) is seated, to the implement 320.

Referring more specifically to FIG. 3, the boom assembly 300 is spaced from the ground 38 at its connection with the upper frame assembly 84 to define a mounting height H3 that allows for an elevated swing radius height H4 for the work machine 10 that is equal to or greater than six feet. The wheels 42,44, lower frame assembly 80, upper frame assembly 84 and boom assembly 300 define an overall work machine height H5. The work machine height H5 is substantially equal to the clearance height H3 and, preferably, equal to or greater than six feet and less than nine feet.

INDUSTRIAL APPLICABILITY

Figure 5A:
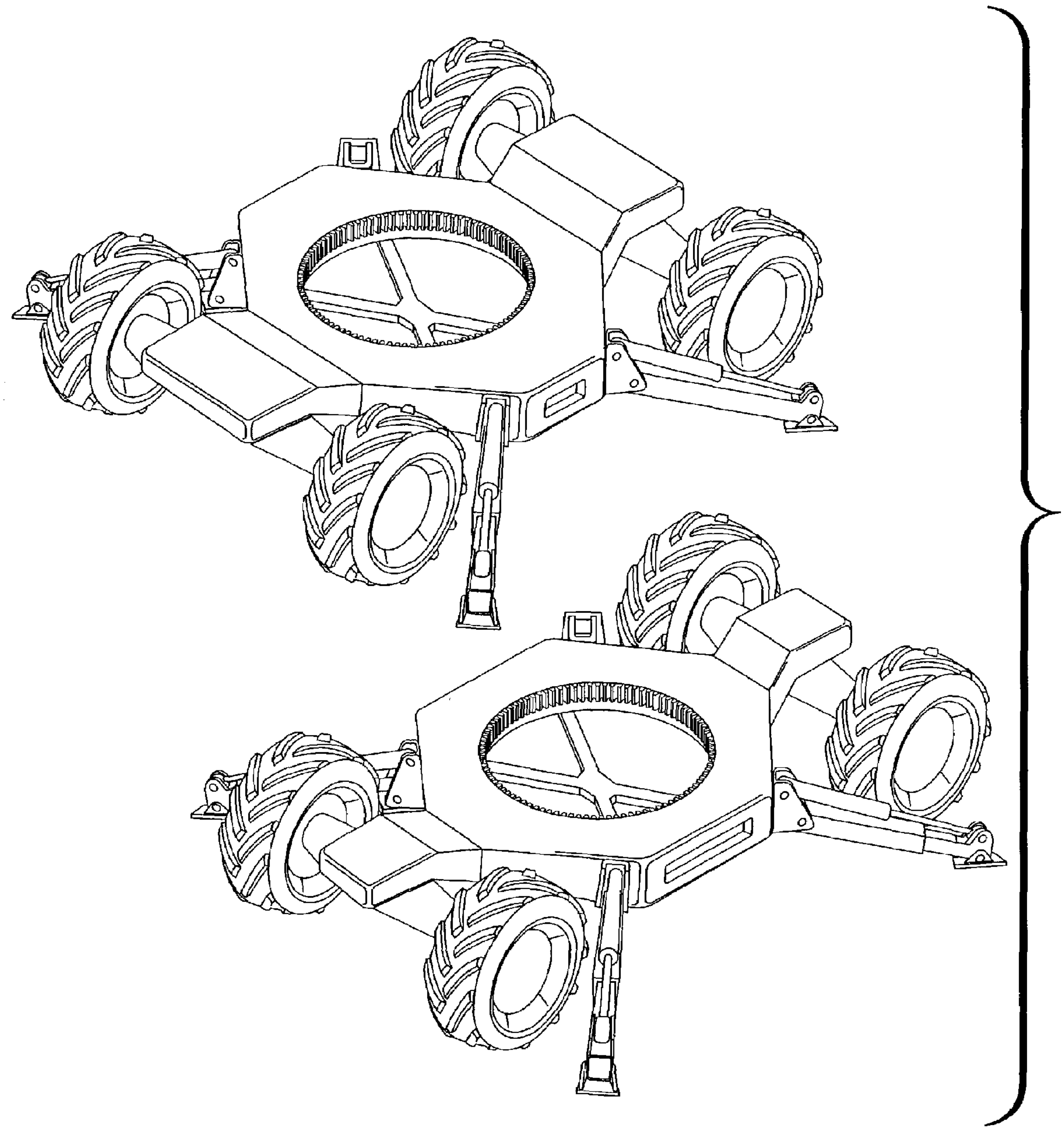
FIGS. 5*a*-5*e* are diagrammatic, perspective representations showing the various stages for manufacturing and assembling the work machine.
Figure 5C:
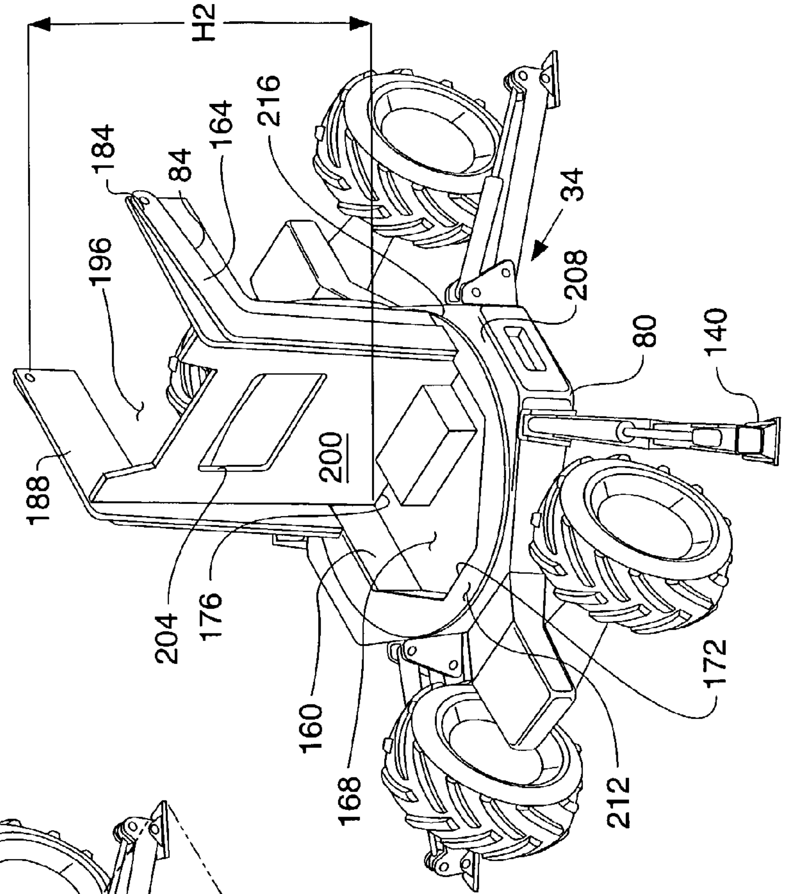
Figure 5B:
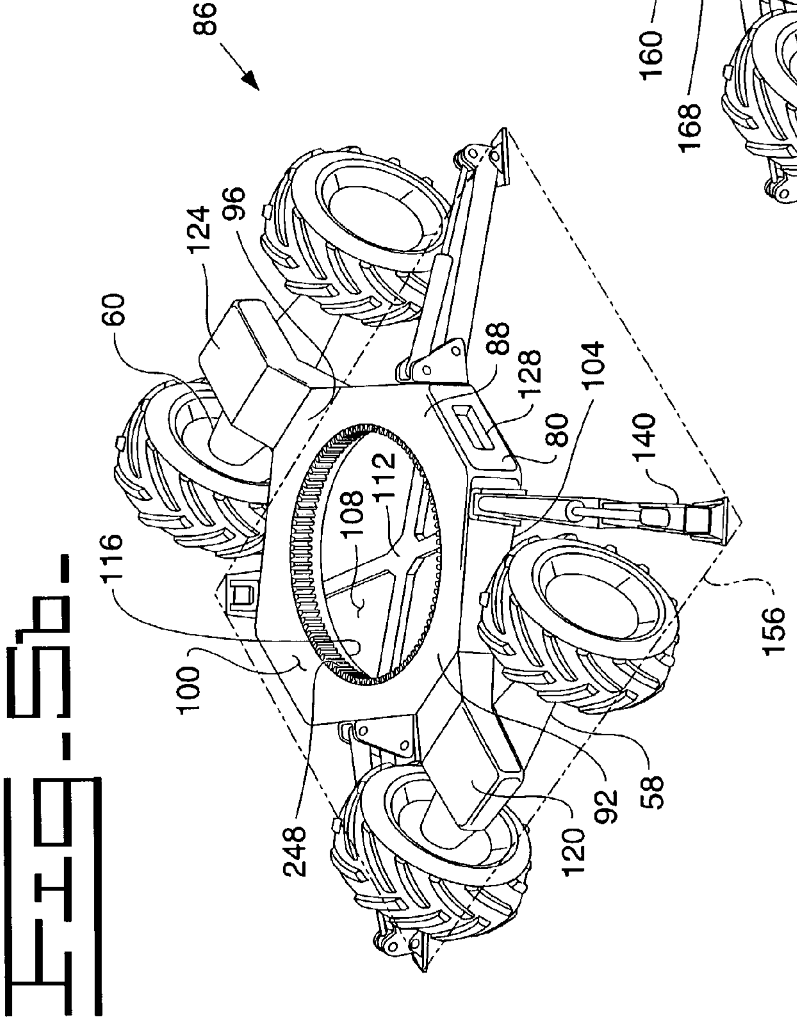
Figures 5D, 5E:
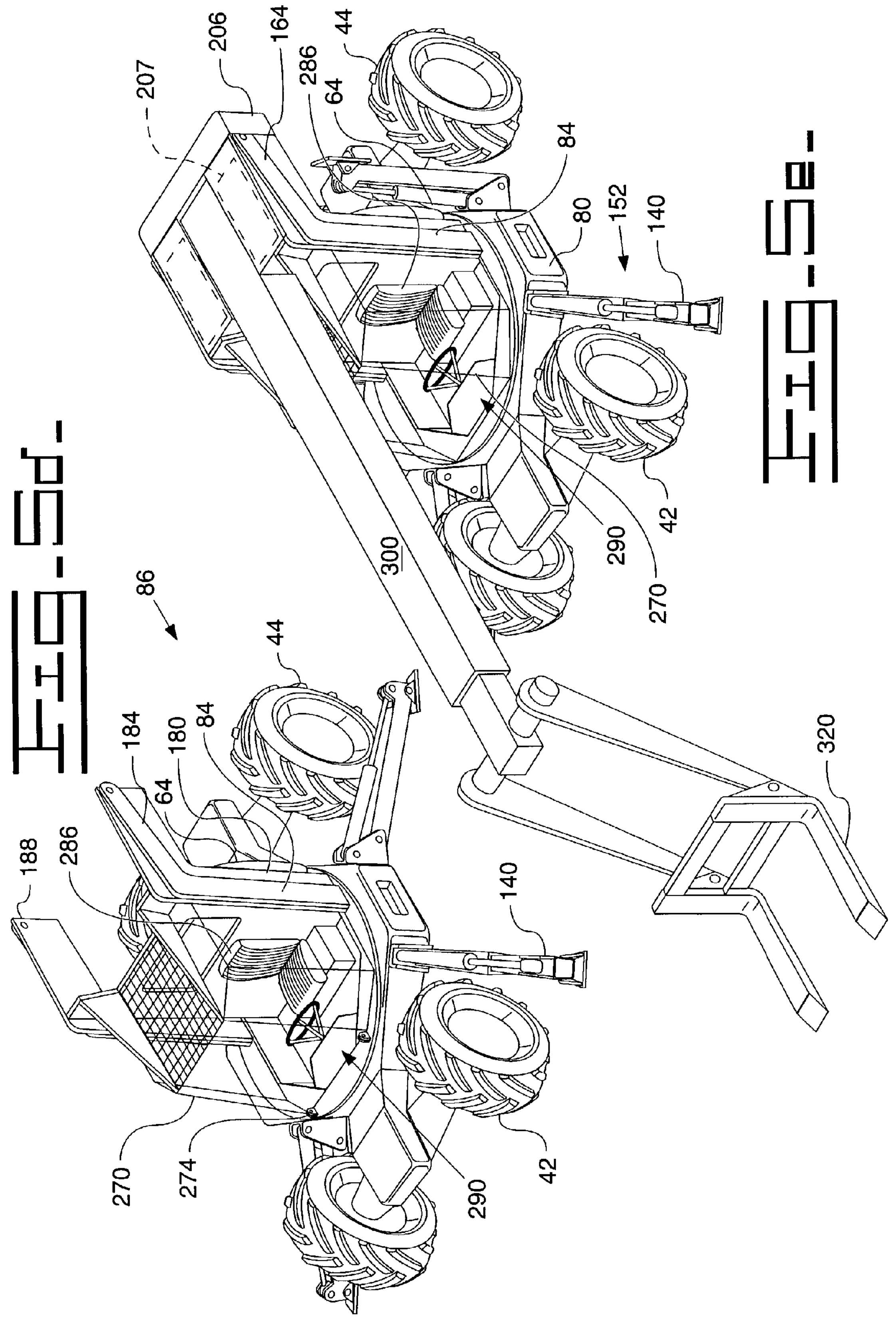
Figure 6:
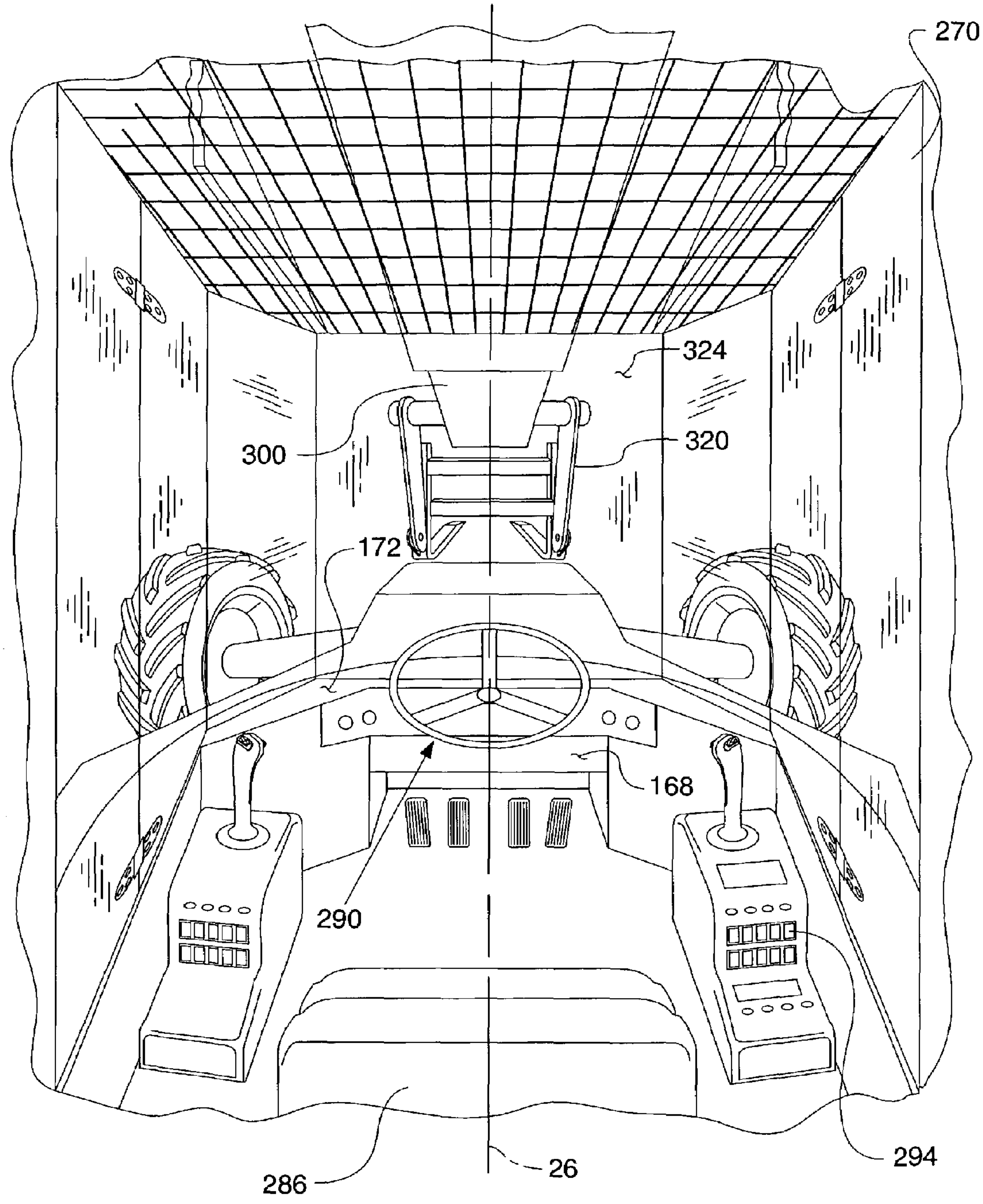
FIG. 6 is a diagrammatic, panoramic view from inside the cab assembly of the work machine as would be seen by an operator seated therein.

Referring to FIGS. 5*a*-5*e*, the method 86 of manufacturing and assembling the work machine 10 to achieve various size configurations is shown. The method 86 involves manufacturing a plurality of lower frame assemblies 80 having various sizes, measured by length, width, height or shape, as seen in FIG. 5*a*. However, each of the lower frame assemblies 80 is manufactured with the recessed area 108 being of a common and predetermined size. A plurality of upper frame assemblies 84 is also manufactured. A select lower frame assembly 80 is identified that provides and corresponds with a desired size configuration of the work machine 10, as depicted in FIG. 5*b*. As shown in FIG. 5*c*, the lower portion 160 of one of the upper frame assemblies 84 is positioned through and into the recessed area 108 of the select lower frame assembly 80 and connected therewith to define the step area 224 for accessing the work machine 10. The upper frame assembly 84 is rotatable about the vertical axis 26 relative to the select lower frame assembly 80 as allowed by the slew ring assembly 240. The power source 64 is also positioned through and partially into the recessed area 108 for connection and rotation with the upper frame assembly 84. As shown in FIG. 5*d*, the lower portion 276 of the cab assembly 270 is positioned through and recessed into the lower portion 160 of the upper frame assembly 84 for pivotal connection and rotation therewith, as described previously. Referring to FIG. 5*e*, the boom assembly 300 and attached implement 320 are connected at the upper portion 164 of the upper frame assembly 84. The counterweight 206 and heat exchanger 207 are positioned adjacent the boom assembly 300 at the upper portion 164 of the upper frame assembly 84 to complete the assembly of the work machine 10.

The position of the power source 64 is such that is acts as a low counterweight for the work machine 10. The heat exchanger 207 is positioned adjacent the counterweight 206 and operative therewith to act as a high counterweight for the work machine 10 in conjunction with the power source 64 throughout rotation of the upper frame assembly 84 about the vertical axis 26 to improve stability of the work machine 10, especially during lifting operations. Further, the positioning of the major components, as described and shown, lowers the center of gravity to enhance stability and performance attributes of the work machine 10. In particular, the top surface 100 of the lower frame assembly 80 is maintained at or below the top surface 46 of the wheels 42,44 while the bottom surface 104 of the lower frame assembly 80 is maintained at or below the midpoint 54 of the wheels 42,44. Additionally, the low position of the power source 64 and the high position of the heat exchanger 207 allow the non-obstructed viewing area 196 for the operator (not shown) from the rear end 176 to the surrounding terrain (not shown). Finally, the positioning of the boom assembly 300 at the upper portion 164 of the upper frame assembly 84 for traversing the vertical axis 26 allows the non-obstructed viewing area 324 for the operator (not shown) from the front end 172 to the implement 320.

Preferably, it should be understood that the plurality of lower frame assemblies 80 are manufactured with a consistent length, width, height or shape. In this methodology, the stabilizers leg assemblies 140, boom assembly 300, and counterweight 206 may be manufactured to establish the varying work machine size configurations without changing the length, width, height or shape of the lower frame assemblies 80. Therefore, the stabilizer leg assemblies 140, boom assemblies 300, and counterweights 206 are the only components that must be manufactured in different sizes to produce a work machine 10 of varying size configurations. In particular, the stabilizer leg assembly 140 may be of a telescopic type, as shown in FIG. 5*a*, to enlarge the footprint 156. Further, the boom assemblies 300 would be of various lengths and telescopic capability and the counterweights would correspond to the various size configurations of the work machine 10. The ability to change only the stabilizer leg assemblies 140, boom assembly 300, and counterweight 300 instead of the lower frame assembly 80 reduces overall manufacturing costs by eliminating the necessity of manufacturing various sized and more complex and expensive lower frame assemblies 80. Further, the positioning and connection of the various sized stabilizer leg assemblies 140, boom assemblies 300, and counterweights 206 would remain substantially consistent on each work machine 10 to simplify the assembly process throughout the various size configurations.

Prior to operation, the operator (not shown) utilizes the method 226 to access the machine by stepping from the ground 38 to the foot holding area 128 and onto the step area 224 defined between the lower and upper frame assemblies 80,84. The operator (not shown) enters the cab assembly 270 by stepping down from the step area to the lower portion 276 thereof, which, simultaneously, positions a portion of the operator (not shown) within the lower portion 160 of the upper frame assembly 84. Due to the mating relationship between the lower and upper frame assemblies 80,84, the step area 224 is maintained throughout rotation of the upper frame assembly 84. In this manner, the operator (not shown) may easily access the work machine 10 at various locations around its periphery, reducing time and costs associated with other work machines having limited access locations.

During operation, the upper frame assembly 84, including the other various rotatable components, such as the power source 64, cab assembly 270 and boom assembly 300, may be rotated about the vertical axis 26 while the work machine 10 is moving or stationary. However, movement of the work machine 10 is enhanced between various locations because the low center of gravity establishes the low overall height H5 and enables the work machine 10 to enter space or height constrained areas. Further, while stationary, the stabilizers 140 are extended to achieve the substantially square footprint 156 and improve the overall stability of the work machine 10.

Therefore, as can be easily understood from the foregoing, the design, manufacture, assembly, and operation of the work machine 10 are improved to enhance stability, clearance, and operator visibility.

Other aspects, objects and advantages of the invention can be obtained from a study of the drawings, the disclosure and the appended claims.

What is claimed is:

1. A work machine having a vertical axis, comprising:

a lower frame assembly having a top surface, a bottom surface, and a recessed area, the recessed area including a floor adjacent the bottom surface;

an upper frame assembly including a portion disposed adjacent the top surface of the lower frame assembly, the upper frame assembly being connected with the lower frame assembly for independent rotation about the vertical axis and including an operator portion, the operator portion being at least partially positioned within the recessed area of the lower frame assembly and supported on the floor of the recessed area; and an engine that transmits power to drive the work machine connected with the upper frame assembly and being at least partially positioned within the recessed area of the lower frame assembly.

2. The work machine of claim 1, including a boom assembly connected with the upper frame assembly and located at a predetermined position on the work machine.

3. The work machine of claim 2, wherein the boom assembly is pivotably connected with the upper frame assembly for movement between a lowered position and a plurality of angled positions and is extendable between a retracted position and a plurality of extended positions.

4. The work machine of claim 3, wherein the predetermined position of the boom assembly is spaced a predetermined distance from the lower frame assembly to define a substantially parallel relationship between the boom assembly and the lower frame assembly when the boom assembly is in the lowered position.

5. The work machine of claim 3, including a cab assembly pivotably connected with the upper frame assembly for movement between an operating position for substantially enclosing the operator portion and a maintenance position, the cab assembly being at least partially positioned within the operator portion and moveable to the maintenance position when the boom assembly is in one of the plurality of angled positions.

6. The work machine of claim 2, wherein the upper frame assembly includes a support portion for mounting the boom assembly, the support portion extending from the operator portion.

7. The work machine of claim 6, wherein the operator portion includes front and rear ends and the support portion includes a pair of spaced tower assemblies that define a substantially non-obstructed viewing area from the rear end of the operator portion.

8. The work machine of claim 7, wherein the upper frame assembly includes an enclosure portion adjacent the operator portion and being at least partially positioned within the recessed area of the lower frame assembly and a reinforcing wall is connected between the tower assemblies to substantially separate the operator portion from the enclosure portion, the reinforcing wall defining a window therethrough operative with the substantially non-obstructed viewing area.

9. The work machine of claim 2, wherein the predetermined position of the boom assembly traverses the vertical axis.

10. The work machine of claim 2, wherein the predetermined position of the boom assembly is above the operator portion opposite the lower frame assembly.

11. The work machine of claim 1, including a plurality of stabilizers pivotally connected with the lower frame assembly for movement between fully retracted and fully extended positions.

12. The work machine of claim 11, wherein the plurality of stabilizers define a substantially square footprint when the stabilizers are extended and in contact with the ground.

13. The work machine of claim 1, wherein the upper frame assembly includes an enclosure portion being at least partially positioned within the recessed area of the lower frame assembly adjacent the operator portion and being substantially separated therefrom, the power source being at least partially positioned within the enclosure portion.

14. The work machine of claim 1, including a cab assembly pivotably connected with the upper frame assembly for movement between an operating position for substantially enclosing the operator portion and a maintenance position, the cab assembly being at least partially positioned within the operator portion.

15. The work machine of claim 1, including a slew ring assembly having first and second ring portions, the first ring portion being connected with the lower frame assembly and the second ring portion being connected with the upper frame assembly and operable with the first ring portion to facilitate the independent rotation of the upper frame assembly, the first and second ring portions being at least partially positioned within the recessed area of the lower frame assembly.

16. The work machine of claim 1, including a boom assembly connected with the upper frame assembly, an implement connected with the boom assembly and the operator portion of the upper frame assembly having front and rear ends, the operator portion being adapted to receive a portion of an operator's body therein to define a substantially non-obstructed viewing area from the front end of the operator portion to the implement.

17. The work machine of claim 1, wherein the operator portion includes front and rear ends and the upper frame assembly includes a support portion having a pair of spaced tower assemblies extending from the operator portion, a boom assembly being mounted on the support portion and an implement being connected with the boom assembly, the operator portion being adapted to receive a portion of an operator's body therein to define a substantially non-obstructed viewing area from the front end of the operator portion to the implement and to define a substantially non-obstructed viewing area from the rear end of the operator portion to the surrounding terrain.

18. The work machine of claim 1, including means for preventing the rotation of the upper frame assembly about the vertical axis.

19. A work machine having a vertical axis, comprising:

a lower frame assembly having a top surface and a bottom surface and defining a recessed area therein, the recessed area including a floor adjacent the bottom surface;

rotation means having a defined opening therethrough and being at least partially disposed within the recessed area of the lower frame assembly and connected therewith;

an upper frame assembly including a portion disposed adjacent the top surface of the lower frame assembly, the upper frame assembly being connected with the lower frame assembly and connected with the rotation means for independent rotation about the vertical axis, the upper frame assembly including an operator portion at least partially disposed within the opening of the rotation means and supported on the floor of the recessed area; and an engine that transmits power to drive the work machine connected with the upper frame assembly and being at least partially disposed within the opening of the rotation means.

20. The work machine of claim 19, including a boom assembly connected with the upper frame assembly and located at a predetermined position on the work machine.

21. The work machine of claim 20, wherein the connection of the boom assembly with the upper frame assembly is spaced a predetermined distance from the ground to define a mounting height for the boom assembly and a swing radius height for the work machine.

22. The work machine of claim 21, wherein the work machine has a predetermined height substantially equal to the mounting height and is substantially equal to or greater than six feet and less than nine feet.

23. The work machine of claim 21, wherein the swing radius height is substantially equal to or greater than six feet.

24. The work machine of claim 20, wherein the operator portion includes front and rear ends and the upper frame assembly includes a support portion for mounting the boom assembly, the support portion includes a pair of spaced tower assemblies positioned respectively at the rear end of the operator portion to define a substantially non-obstructed viewing area from the rear end of the operator portion.

25. The work machine of claim 19, wherein the rotation means includes a slew ring assembly having first and second ring portions, the first ring portion being connected with the lower frame assembly and the second ring portion being connected with the upper frame assembly and operable with the first ring portion to facilitate the independent rotation of the upper frame assembly.

26. The work machine of claim 19, wherein the upper frame assembly includes an enclosure portion being at least partially disposed within the opening of the rotation means adjacent the operator portion for retaining the power source, the enclosure portion being substantially separated from the operator portion.

27. The work machine of claim 19, including a plurality of stabilizers pivotally connected with the lower frame assembly for movement between fully retracted and fully extended positions wherein the plurality of stabilizers define a substantially square footprint when the stabilizers are extended and in contact with the ground.

28. The work machine of claim 19, including a boom assembly connected with the upper frame assembly, an implement connected with the boom assembly and the operator portion of the upper frame assembly having front and rear ends with the operator portion being adapted to receive a portion of an operator's body therein to define a substantially non-obstructed viewing area from the front end of the operator portion to the implement.

29. The work machine of claim 19, wherein the operator portion includes front and rear ends and the upper frame assembly includes a support portion having a pair of spaced tower assemblies extending from the operator portion, a boom assembly being mounted on the support portion and an implement being connected with the boom assembly, the operator portion being adapted to receive a portion of an operator's body therein to define a substantially non-obstructed viewing area from the front end of the operator portion to the implement and to define a substantially non-obstructed viewing area from the rear end of the operator portion to the surrounding terrain.

30. The work machine of claim 19, including means for preventing the rotation of the upper frame assembly.

31. A work machine having a vertical axis, comprising:

a lower frame assembly having top and bottom surfaces and a predetermined height;

an upper frame assembly including a portion disposed adjacent the top surface of the lower frame assembly, the upper frame assembly being connected with the lower frame assembly for independent rotation about the vertical axis and having a predetermined height, a portion of the height of the upper frame assembly defining a portion of the height of the lower frame assembly; and driving means comprising an engine and having top and bottom surfaces and a midpoint substantially therebetween, the driving means supporting the lower and upper frame assemblies with the top surface of the lower frame assembly being equal with or below the top surface of the driving means and the bottom surface of the lower frame assembly being equal with or below the midpoint of the driving means, wherein the upper frame assembly has upper and lower portions with the lower portion being at least partially positioned within the lower frame assembly and including the engine that transmits power to drive the work machine connected with the lower portion of the upper frame assembly.

32. The work machine of claim 31, wherein the engine counterweights the work machine throughout rotation of the upper frame assembly.

33. The work machine of claim 32, wherein an additional counterweight for the work machine is spaced a predetermined distance from the power source.

34. The work machine of claim 33, wherein the additional counterweight is connected at the upper portion of the upper frame assembly.

35. The work machine of claim 34, including a cooling system operable with the engine, a portion of the cooling system being connected with the upper portion of the upper frame assembly adjacent the additional counterweight.

36. The work machine of claim 31, including a boom assembly connected with the upper frame assembly wherein the work machine has a front end portion, a rear end portion and a central portion through which the vertical axis extends and the boom assembly traverses the vertical axis.

37. A work machine having a vertical axis, comprising:

a lower frame assembly having a recessed area therein;

an upper frame assembly connected with the lower frame assembly for independent rotation about the vertical axis and including an operator portion, the operator portion being at least partially positioned within the recessed area of the lower frame assembly; and an engine connected with the upper frame assembly and being at least partially positioned within the recessed area of the lower frame assembly; and a boom assembly connected with the upper frame assembly and located at a predetermined position on the work machine rearward of the engine relative to the operator portion, wherein the connection of the boom assembly with the upper frame assembly is spaced a predetermined distance from the ground to define a mounting height for the boom assembly and a swing radius height for the work machine.

38. The work machine of claim 37, wherein the work machine has a predetermined height substantially equal to the mounting height and is substantially equal to or greater than six feet and less than nine feet.

39. The work machine of claim 37, wherein the swing radius height is substantially equal to or greater than six feet.

40. A work machine having a vertical axis, comprising:

a lower frame assembly including a top surface and a bottom surface;

a slew ring assembly defined by an inner and outer rings, the inner ring being connected with the lower frame assembly between the top and bottom surfaces;

an upper frame assembly defining an operator portion and an enclosure portion being at least partially disposed within the lower frame assembly, the upper frame assembly being connected with the lower frame assembly through the outer ring of the slew ring assembly so that rotation of the outer ring of the slew ring assembly causes rotation of the upper frame assembly about the vertical axis;

a cab assembly attached to the upper frame assembly and having a lower portion at least partially disposed within the operator portion, the cab assembly being rotatable with the upper frame assembly;

an engine that transmits power to drive the work machine attached to the upper frame assembly and being at least partially disposed within the enclosure portion, the engine being rotatable with the upper frame assembly; and a boom assembly connected with the upper frame assembly at a position rearward of the engine relative to the operator portion.

* * * * *